United States Patent [19]

Ernst et al.

[11] 3,772,599

[45] Nov. 13, 1973

[54] MICROWAVE DOUBLE BALANCED MIXER

[75] Inventors: Robert Lewis Ernst, East Brunswick; Shui Yuan, Princeton, both of N.J.

[73] Assignee: RCA Corporation, New York, N.Y.

[22] Filed: Apr. 17, 1972

[21] Appl. No.: 244,565

[52] U.S. Cl. ................ 325/446, 325/435, 333/84 R
[51] Int. Cl. ............................................ H04b 1/26
[58] Field of Search .................... 325/430, 431, 434, 325/435-436, 439, 442, 445, 446; 321/61, 65, 69 W; 332/43, 44; 333/84 R, 84 M, 7 D; 328/156

[56] References Cited

UNITED STATES PATENTS 3,678,395 7/1972 Hunton et al. ...................... 325/446

*Primary Examiner*—Benedict V. Safourek
*Assistant Examiner*—Marc E. Bookbinder
*Attorney*—Edward J. Norton

[57] ABSTRACT

A slot transmission line and a microstrip transmission line provide the design of a double balanced mixer operable at microwave frequencies.

10 Claims, 2 Drawing Figures

MICROWAVE DOUBLE BALANCED MIXER

DESCRIPTION OF THE PRIOR ART

A double balanced mixer is used to convert a first input signal at a frequency $f_1$ and a second input signal at a frequency $f_2$ to a third signal at a frequency $f_3$. At relatively low operating frequencies, transformers can be used to couple the first and second input signals to a configuration of four nonlinear diodes optimally arranged to produce the desired third signal at a frequency $f_3$. The double balanced mixer is also useful at microwave frequencies. However, transformers used at relatively low frequencies are not readily applicable at microwave frequencies. Microwave double balanced mixers using distributed transmission lines as a substitute for low frequency transformers have been built. A three dimensional coaxial transmission line double balanced mixer has been described in the November 1968 issue of the IEEE Transactions On Microwave Theory and Techniques, pages 911 to 918. The three dimensional coaxial transmission line double balanced mixer is not readily transferable to a planar type structure desirable in microwave integrated circuit design. A planar structure suitable for microwave integrated circuit (M.I.C.) design has been described in the 1970 International Microwave Symposium Digest, pages 196 to 199. The described planar structure requires the use of a toroid, a low frequency component, for coupling the third signal from the diode configuration. Therefore, the frequency, $f_3$, of the third signal is limited to operating range of the toroid.

A solution to the frequency limitations on a M.I.C. double balanced mixer is a planar structure using only distributed transmission lines for coupling the input microwave signals to the diode configuration and a distributed transmission line section for coupling a third microwave signal from the diode configuration.

SUMMARY OF THE INVENTION

A double balanced mixer is provided having four nonlinear diodes and in which first and second planar conductive sheets form sides of a continuous slot transmission line ring intersected at a relatively high voltage point, at a predetermined frequency, by a second planar slot transmission line. The second slot transmission line has a first section terminated in the second conductive sheet and a second sheet terminated in the first conductive sheet. The intersection between the slot transmission line ring and the second slot transmission line provides first and second conductive corners in the first conductive sheet and third and fourth conductive corners in the second conductive sheet. The anode of a first diode is connected to the first conductive corner and the cathode of the first diode is connected to the third conductive corner diagonally opposite the first conductive corner. The anode of a second diode is connected to the second conductive corner and the cathode of the second diode is connected to the fourth conductive corner. The anode of a third diode is connected to the fourth conductive corner and the cathode of the third diode is connected to the first conductive corner. The anode of a fourth diode is connected to the third conductive corner and the cathode of the fourth diode is connected to the second conductive corner.

Means are provided for coupling a first signal at a frequency $f_1$ to the second slot transmission line whereby the magnitude of the D.C. potential of the first planar conductive sheet is different from the magnitude of the D.C. potential of the second planar conductive sheet. Means are provided for coupling a second signal at a frequency $f_2$ to the second slot transmission line, whereby the signals are processed by the four diodes to provide a third signal at a frequency $f_3$. Means are provided for coupling the diode generated third signal from the slot transmission line ring.

DESCRIPTION OF THE PREFERRED EMBODIMENT

Figure 1:
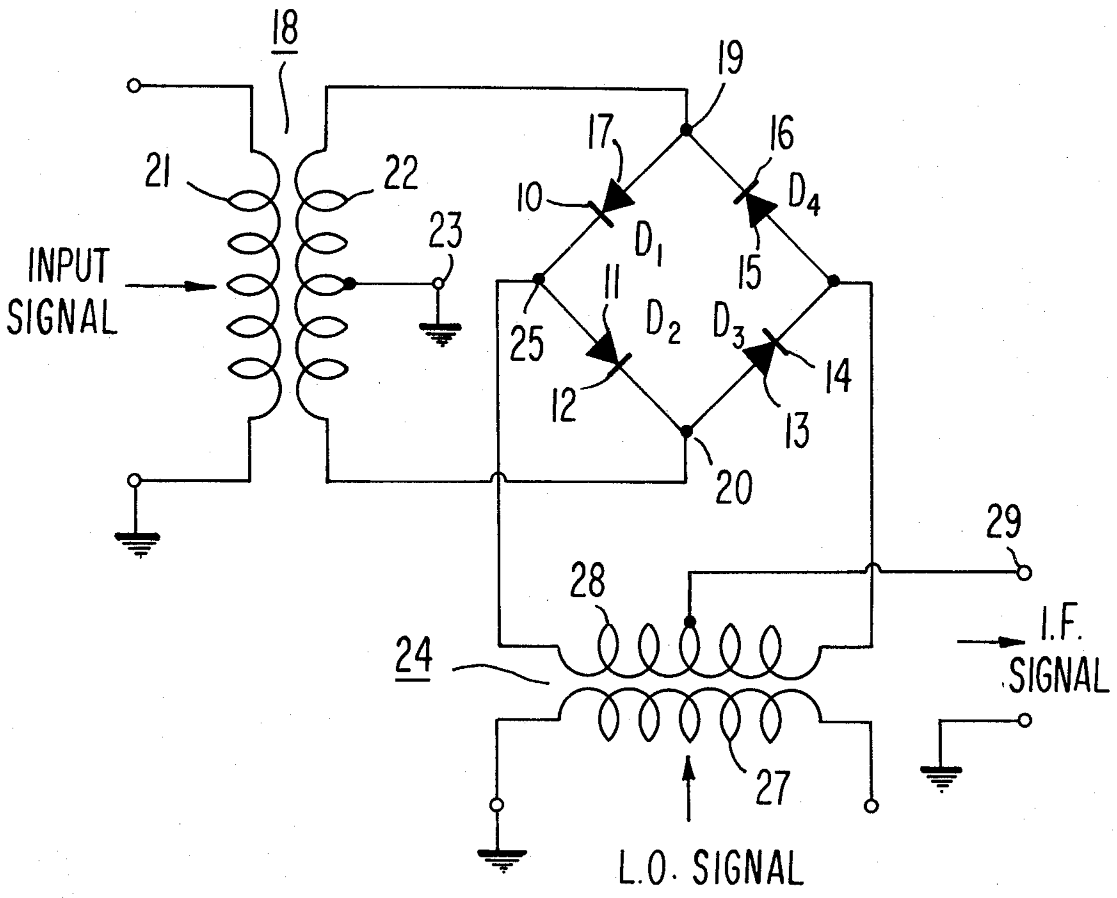
FIG. 1 is a schematic of a double balanced mixer circuit.

Referring to FIG. 1, there is shown a schematic representation of a double balanced mixer. A double balanced mixer is a component that uses a ring configuration of four nonlinear devices $D_1$, $D_2$, $D_3$ and $D_4$, to convert a local oscillator (L.O.) signal at a frequency $f_1$ and an input signal at a frequency $f_2$ to an output signal at a frequency $f_3$. A resistive diode having a nonlinear current versus voltage characteristics is an example of a nonlinear device suitable for use in a double balanced mixer.

An example of a ring configuration of four diodes is the connection of the cathode 10 of diode $D_1$ to the anode 11 of diode $D_2$. The cathode 12 of diode $D_2$ is connected to the anode 13 of diode $D_3$. The cathode 14 of diode $D_3$ is connected to the anode 15 of diode $D_4$. The cathode 16 of diode $D_4$ is connected to the anode 17 of diode $D_1$. An input transformer 18 is used to couple an input signal across the ring configuration terminals 19 and 20. One end of the primary winding 21 of the input transformer 18 is connected to ground potential. The secondary winding 22 of the input transformer 18 is connected to the ring configuration terminals 19 and 20. The center tap 23 of the input transformer 18 is connected to ground potential. An L.O. transformer 24 is used to couple the L.O. signal across the ring configuration terminals 25 and 26. One end of the primary winding 27 of the L.O. transformer 24 is connected to ground potential. The secondary winding 28 of the L.O. transformer 24 is connected to the ring configuration terminals 25 and 26. The resistive diodes $D_1$, $D_2$, $D_3$ and $D_4$ generate a signal containing many frequency components in response to the combination of the applied L.O. and input signals. A desired diode generated frequency component is the intermediate frequency (I.F.) or frequency difference between the L.O. and input signals. The I.F. frequency component is coupled from the center tap 29 of the L.O. transformer 24.

Double balanced mixers have several advantages over other types of balanced mixers. Some of these advantages are carrier suppression, improved dynamic range, reduction of filtering requirements at the mixer ports and suppression of many intermodulation products. The isolation of signals at undesired frequencies at the input and output mixer ports is achieved by the symmetrical arrangement of the mixer diodes. Therefore, external filters at the input and L.O. ports are not required. Some of the essential features of the double balanced mixer are:

1. The connection of four nonlinear devices in a ring arrangement as shown in FIG. 1.

2. The excitation of ring configuration terminals 19 and 20, and 25 and 26 by balanced input and L.O. voltages.

3. A path to ground for ring configuration terminals 19 and 20 for the D.C. and I.F. frequency components generated by the four nonlinear devices.

4. An I.F. output signal coupled from the center tap of the L.O. transformer 24. The L.O. transformer 24 provides a common connection of ring configuration terminals 25 and 26.

A balanced mixer is readily available at relatively low frequencies where components such as transformers are easily constructed. The difficulties of achieving a practical double balanced mixer is multiplied when the operating frequencies are increased into the microwave range. A microwave equivalent to a low frequency transformer must be designed and used in a configuration that provides the essential features of a double balanced mixer.

Figure 2:
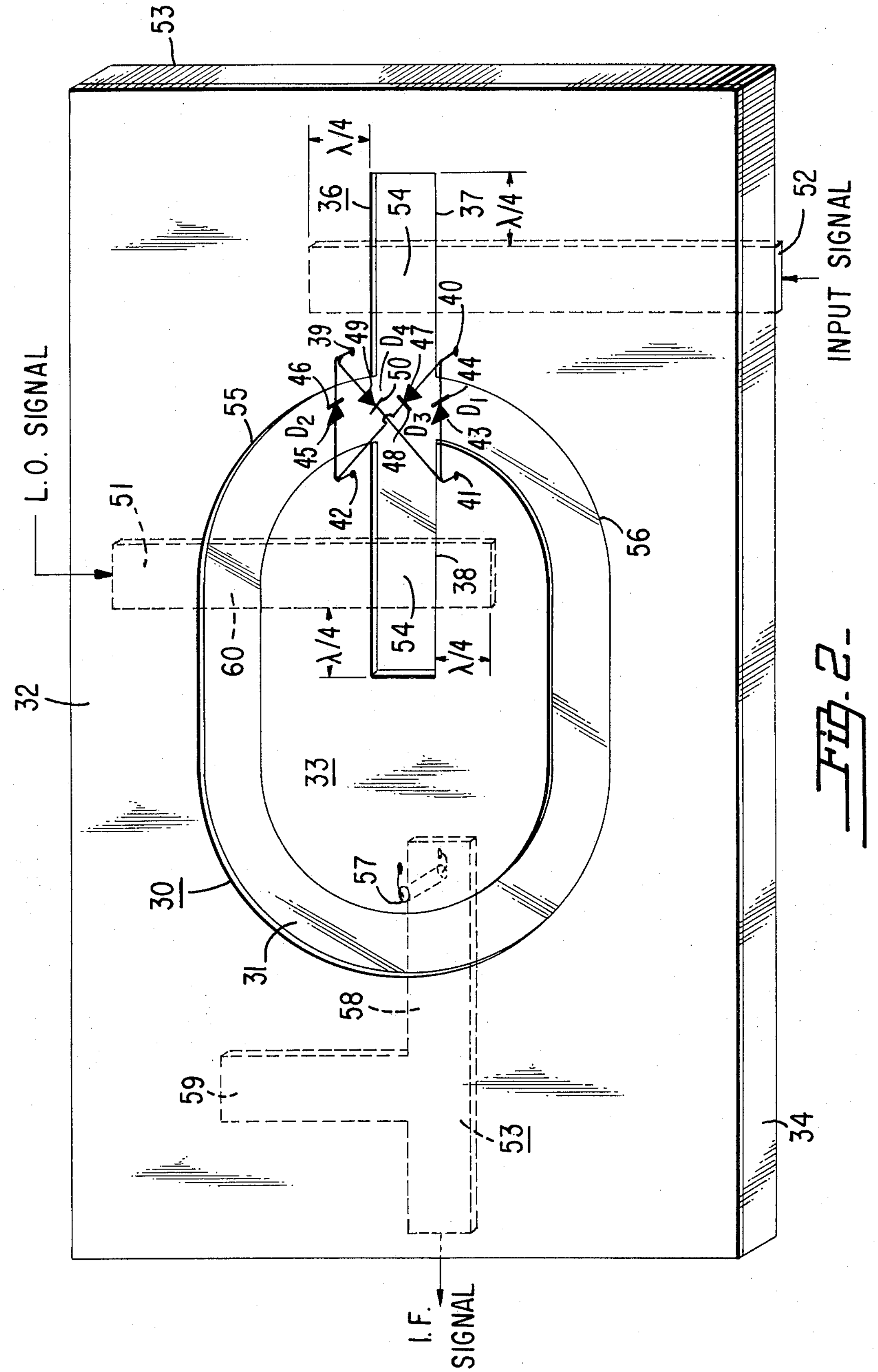
FIG. 2 is a top view of a microwave double balanced mixer using a slot transmission line and a microstrip transmission line.

Referring to FIG. 2, there is shown a top view of a microwave double balanced mixer using a slot transmission line and a microstrip transmission line. A slot transmission line consists of a narrow slot in a conductive plane on one side of a dielectric substrate. The dominant mode of electromagnetic propagation in slot transmission line is quite similar to that of the $TE_{10}$ mode of rectangular waveguide. The slot transmission line electromagnetic fields must be closely confined to the slot. Dielectric substrates having relatively high magnitudes of dielectric constant are used to confine the electromagnetic fields within the slot area.

A slot transmission line ring 30 is formed by the narrow slot 31 between a first conductive plane 32, at D.C. and I.F. ground potential, and a second conductive plane 33 on one side of a dielectric substrate 34. One method of establishing D.C. and I.F. ground potential at the first conductive plane is by connecting the first conductive plane to the outer or ground conductor of a coaxial connector. The slot transmission line ring 30 is intersected by a second slot transmission line 36. The second slot transmission line has a first section 37 terminated in the first conductive plane 32 and a second section 38 terminated in the second conductive plane 33. The intersection between the slot transmission line ring 30 and the second slot transmission line 36 provides four conductive corners 39, 40, and 41 and 42 used for connecting four nonlinear resistive diodes $D_1$, $D_2$, $D_3$ and $D_4$ in a ring arrangement. The conductive corners 39 and 40 are on the first conductive plane 32 and are therefore at D.C. and I.F. ground potential. The conductive corners 41 and 42 are isolated from D.C. and I.F. ground potential by the slot 31. An example of a possible ring connection of diodes $D_1$, $D_2$, $D_3$ and $D_4$ is illustrated by connecting the anode 43 of $D_1$ to corner 41, the cathode 44 of $D_1$ to corner 40, the anode 45 of $D_2$ to corner 42, the cathode 46 of $D_2$ to corner 39, the anode 47 of $D_3$ to corner 40, the cathode 48 of $D_3$ to corner 42, the anode 49 of $D_4$ to corner 39 and the cathode 50 of $D_4$ to corner 41. Microstrip transmission lines are used to couple the L.O. and input signals to the diodes $D_1$, $D_2$, $D_3$ and $D_4$. A microstrip transmission line confines the electromagnetic fields of an input signal between a center conductor and ground plane.

In FIG. 2, the microstrip center conductors 51 and 52 are on the bottom surface 53 of the dielectric substrate 34. The necessary microstrip ground plane is the first and second conductive planes 32 and 33. An efficient transfer of energy from microstrip to slot transmission line occurs under certain conditions when the second slot transmission line 36 crosses over the microstrip center conductors 51 and 52 at right angles. The efficiency is optimized when the microstrip center conductors 51 and 52 extend beyond the cross over point 54 and are terminated in an open circuit. The electrical length of the center conductor extension is $\lambda/4$, where $\lambda$ is the microstrip wavelength at the frequency of the signal coupled to the particular microstrip transmission line. The second slot transmission line 36 also extends beyond the cross over point 54. The electrical length of the second slot transmission line extension is $\lambda/4$, where $\lambda$ is the slot transmission line wavelength at the frequency of the signal coupled to the microstrip transmission line.

The intersection between the slot transmission line ring 30 and the second slot transmission line 36 provide two paths 55 and 56 along the ring 30 for energy transmission. It is desirable that these paths 55 and 56 appear as an open circuit or high impedance at the L.O. and input frequencies. A method of accomplishing this result is to terminate each path 55 and 56 in a short circuit or low impedance connection to ground. The electrical length of each slot transmission line path 55 and 56, from the intersection to the short circuit termination, is $(2n+1)\lambda/4$, where $\lambda$ is the slot transmission line wavelength at the average of the L.O. and input signal frequencies and $n$ is an integer. A microstrip low pass filter having a cutoff frequency less than the L.O. and input signal frequencies is one method of providing a short circuit termination or low impedance path to ground at the L.O. and input frequencies. Another method is a band stop filter 53 resonant at the L.O. and input signal frequencies. The high impedance conductor 58 of the microstrip band stop filter 53 is connected to the second conductive sheet 33 via the connecting pin 57. The electrical length of the high impedance conductor 58 from the connecting pin 57 to an open circuited shunt connected stub 59 is $\lambda/2$, where $\lambda$ is the wavelength at the resonant frequency of the filter 53. The open circuited shunt connected stub 59 is the low impedance conductor of the microstrip band stop filter 53. The electrical length of the open circuited stub 59 from its open circuited end to the high impedance conductor 58 is $\lambda/4$, where $\lambda$ is the wavelength at the filter's 53 resonant frequency. The second conductive sheet 33 is at the I.F. potential, therefore, the band stop filter 53 also transmits the I.F. signal to a load, not shown.

It is desirable to provide a continuity of ground currents from the first conductive sheet 32 to the second conductive sheet 33. This is accomplished by crossing center conductor 51 over a low impedance point along the transmission line ring 30. A cross over at this point 60 also prevents the coupling of the L.O. signal to the slot transmission line ring 30. The electrical length from the band stop filter 53 to the cross over point 60 is $\lambda/2$, where $\lambda$ is the wavelength at the L.O. frequency.

By way of example, the characteristic impedance of the slot transmission line ring 30, the second slot transmission lines 36 and the microstrip transmission lines 51 and 52 for the L.O. and input signals is 50 ohms.

The dielectric constant of the dielectric substrate is 9.8. The diodes are Schottky barrier mixer diodes operative from 6 to 12 GHz. The conversion loss of the I.F. double balanced mixer at 0.549 GHz is −9.6dB when a 2.65mW L.O. signal at 6.755 GHz and a −30dbm input signal at 7.304 GHz is coupled to the mixer.

A double balanced mixer using a combination of slot transmission line and microstrip has been illustrated. A band stop filter 53 is described as one method for providing a short circuit at the L.O. and input signal frequencies. A capacitor having one terminal connected to the first conductive sheet 32 and a second terminal connected to the second conductive sheet 33 and a low impedance at the L.O. and input signal frequencies would also provide the required low impedance path to ground. While actual connections have not been shown for applying the input and L.O. signals to their respective microstrip transmission lines and for deriving the I.F. signal from the band stop filter 53, such connections would be made using state of the art coaxial connectors or other means as required by the particular application. Thus, numerous and varied other arrangements can readily be devised in accordance with the disclosed principles by those skilled in the art.

What is claimed is:

1. A double balanced mixer comprising:

first and second coplanar conductors forming a first slot transmission line, said first coplanar conductor being at a first D.C. potential and said second coplanar conductor being at a second different D.C. potential, a second slot transmission line intersecting said first slot transmission line, a first microstrip transmission line for coupling a first signal at a first frequency to a first portion of said second slot transmission line, a second microstrip transmission line for coupling a second signal at a second frequency to a second portion of said slot line, four nonlinear unidirectional current conducting devices connected at said intersection of said slot transmission lines to combine said first and second signals to provide along said first slot transmission line a third signal at a third frequency, and means for coupling said third signal from said first slot transmission line.

2. In combination, a first planar conductor at a first D.C. potential and a second coplanar conductor at a second different D.C. potential, said conductors forming with a dielectric substrate a continuous slot transmission line ring intersected by a second planar slot transmission line having a first section on one side of said intersection terminated in said second conductor and a second section on another side of said intersection terminated in said first conductor, said intersection providing first and second conductive corners in said first conductor and third and fourth conductive corners in said second conductor, means for coupling a first signal at one frequency and a second signal at a second frequency to said second slot transmission line, nonlinear unidirectional current conducting means interconnected between said corners to combine said first and second signals to propagate in said slot transmission line ring a third signal at a third frequency, and means for coupling said third signal from said slot transmission line ring.

3. The combination as claimed in claim 2, said first and second planar conductors being on one side of said substrate, said first signal coupling means including a conductive strip on the opposite side of said substrate forming with said first planar conductor a first microstrip transmission line with said conductive strip passing across one section of said second slot transmission line to couple said first signal from said first microstrip transmission line to said second slot transmission line, said second signal coupling means including a second conductive strip on said opposite side of said substrate forming with said first planar conductor and said second coplanar conductor a second microstrip transmission line with said second conductive strip passing across the other section of said second slot transmission line to couple said second signal from said second microstrip transmission line to said second slot transmission line.

4. The combination as claimed in claim 3, said respective first and second conductive strips passing across said respective sections of said second slot transmission line at right angles.

5. The combination as claimed in claim 4, one of said conductive strips also passing across said slot transmission line ring at a low relatively impedance point along said ring.

6. The combination as claimed in claim 3, said third signal coupling means including a third microstrip transmission line circuit providing an efficient transmission path for said third signal and a low impedance path to ground for said first and second signals.

7. The combination as claimed in claim 6, said third signal coupling means including a band stop filter resonant at said first and second signal frequencies, said third microstrip transmission line coupled to said ring at a predetermined point along said ring from said intersection to provide a high impedance at said intersection at said first and second signal frequencies.

8. The combination as claimed in claim 7, said predetermined point being determined to provide first and second electrically equal length paths along said ring from said intersection, said paths having a length $(2n + 1)\lambda/4$, where $n$ is an integer and $\lambda$ is the slot line wavelength at an average of said first and second signal frequencies.

9. The combination as claimed in claim 6, said nonlinear unidirectional current conducting means including first, second, third and fourth diodes each having an anode and a cathode, the anode of said first diode being connected to said first corner and the cathode of said first diode being connected to said third corner diagonally opposite said first corner, the anode of said second diode being connected to said second corner and the cathode of said second diode being connected to said fourth corner, the anode of said third diode being connected to said fourth corner and the cathode of said third diode being connected to said first corner, the anode of said fourth diode being connected to said third corner and the cathode of said fourth diode being connected to said second corner.

10. A double balanced mixer having first, second, third and fourth nonlinear diodes, comprising:

first and second coplanar conductive sheets forming a continuous slot transmission line ring intersected by a second coplanar slot transmission line having a first section terminated in said second conductive sheet and a second section terminated in said first conductive sheet, said intersection having first and second conductive corners in said first conductive sheet and third and fourth conductive corners in said second conductive sheet with the anode of said first diode connected to said first conductive corner and the cathode of said first diode connected to said third conductive corner diagonally opposite said first conductive corner, the anode of said second diode connected to said second conductive corner and the cathode of said second diode connected to said fourth conductive corner, the anode of said third diode connected to said fourth conductive corner and the cathode of said third diode connected to said first conductive corner, the anode of said fourth diode connected to said third conductive corner and the cathode of said fourth diode connected to said second conductive corner, means for coupling a first signal at frequency $f_1$ to said second slot transmission line, said first planar conductive sheet having a first D.C. potential and said second planar conductive sheet having a second different D.C. potential, means for coupling a second signal at a frequency $f_2$ to said second slot transmission line, whereby said signals are processed by said diodes to provide a third signal at frequency $f_3$, and means for coupling said third signal at frequency $f_3$ from said slot transmission line ring.

* * * * *

UNITED STATES PATENT OFFICE
CERTIFICATE OF CORRECTION

Patent No. 3,772,599 Dated November 13, 1973

Inventor(s) Robert Lewis Ernst and Shui Yuan

It is certified that error appears in the above-identified patent and that said Letters Patent are hereby corrected as shown below:

Column 1, line 48, change "sheet" second occurrence to --section--.

Column 6, line 32, Claim 5, change "a low relatively impedance" to --a relatively low impedance--.

Signed and sealed this 23rd day of April 1974.

(SEAL)
Attest:

EDWARD M.FLETCHER,JR.
Attesting Officer

C. MARSHALL DANN
Commissioner of Patents